United States Patent [19]
Vinci et al.

[11] Patent Number: 5,456,927
[45] Date of Patent: * Oct. 10, 1995

[54] RUMINANT FEED SUPPLEMENT PRODUCT

[75] Inventors: Alfredo Vinci, Dayton; M. Stephen Lajoie, Basking Ridge; Kenneth R. Cummings, Skillman; Ronald L. Forrest, Cranbury, all of N.J.

[73] Assignee: Church & Dwight Co., Inc., Princeton, N.J.

[ * ] Notice: The portion of the term of this patent subsequent to Aug. 17, 2010, has been disclaimed.

[21] Appl. No.: 149,305

[22] Filed: Nov. 9, 1993

Related U.S. Application Data

[63] Continuation-in-part of Ser. No. 7,013, Jan. 21, 1993, which is a continuation of Ser. No. 802,261, Dec. 4, 1991, abandoned.

[51] Int. Cl.⁶ .................................................. A23K 1/00
[52] U.S. Cl. ............................... 426/74; 426/72; 426/601; 426/648; 426/656; 426/807
[58] Field of Search ................................ 426/72, 74, 601, 426/648, 656, 807

[56]  References Cited

U.S. PATENT DOCUMENTS

| | | | |
|---|---|---|---|
| 4,729,896 | 3/1988 | Sawhill | 426/74 X |
| 4,826,694 | 5/1989 | McAskie | 426/74 |
| 5,236,723 | 8/1993 | Lajoie et al. | 426/74 X |

Primary Examiner—Steven Weinstein
Assistant Examiner—Lien Tran
Attorney, Agent, or Firm—Charles B. Barris

[57] ABSTRACT

A process for preparing a fatty acid calcium salt ruminant feed supplement product which contains an incorporated methionine hydroxy analog calcium salt additive. The dietary product can function as a rumen bypass feed supplement, and permit a beneficial increase in the nutrient fat content of the feed.

11 Claims, No Drawings

RUMINANT FEED SUPPLEMENT PRODUCT

CROSS-REFERENCE TO RELATED APPLICATIONS

The present patent application is a continuation-in-part of patent application Ser. No. 08/007,013, filed Jan. 21, 1993, which is a continuation of patent application Ser. No. 07/802,261, filed Dec. 4, 1991 (now abandoned); incorporated by reference.

BACKGROUND OF THE INVENTION

Conventional cattle feeds such as corn and alfalfa often fail to provide sufficient energy for cattle, especially lactating dairy cattle during periods of heavy milk production. Feed containing a high proportion of corn also has a tendency to depress the milk fat content of the milk produced by such cattle. Fat is an excellent energy source, and it is known that if the proportion of fat in cattle food is increased, lactating dairy cattle produce high milk yields without draining their reserves of body fat and without diminishing the proportion of milk fat in the milk produced.

However, it has been found that if the proportion of fat in the diet of cattle exceeds about 2% of the total feed in solids, the feed has toxic effects upon the microorganisms in the rumen of the cattle. It appears that fat reduces the growth rate or even kills certain microorganisms which digest fiber in the cow's rumen, thereby lowering fiber digestibility. This deleterious effect on the cow's rumen is particularly true of unsaturated fats. Although the decreased fiber digestion in the rumen is partially compensated by greater fiber digestion in the lower parts of the alimentary canal, such later fiber digestion produces a blend of different fatty acids than that which is produced by the digestion in the rumen, and the different blend of fatty acids is less suited to the cow's metabolism.

It is known also that triglycerides and free fatty acids can physically coat fibrous or cellulosic material in the rumen and inhibit fermentation of the material by the bacteria. This has an adverse effect on the total digestibility of the diet, and can result in a reduced yield of milk and butter-fat.

There has been a continuing need for new dietary supplements for animal feedstuff which can be fed to ruminant animals without interfering with feed metabolism by rumen microorganisms.

U.S. Pat. Nos. 4,642,317; 4,826,694; 4,853,233; and 4,909,138 describe the incorporation of insoluble fatty acid salts in ruminant feed as a means of increasing the fat content of the feed without deleteriously affecting the ruminant digestion cycle. A feed additive such as fatty acid calcium salt functions as a rumen bypass product, and is subsequently metabolized in the abomasum or small intestine of the ruminant. This type of feed optionally can include a biologically active ingredient such as an aminoacid.

Accordingly, it is an object of the invention to provide a process for the production of a ruminant feed supplement product which can function as a rumen bypass composition, and permit a beneficial increase in the dietary fat content of the feed.

It is another object of this invention to provide a fatty acid salt ruminant feed supplement product which has incorporated one or more additional biologically active nutrient ingredients having rumen bypass protection.

Other objects and advantages of the present invention shall become apparent from the accompanying description and examples.

DESCRIPTION OF THE INVENTION

One or more objects of the present invention are accomplished by the provision of a process for the preparation of a ruminant feed supplement product which comprises (1) forming an admixture of ingredients comprising (a) at least one $C_{14}$–$C_{22}$ fatty acid, (b) calcium oxide in about a 0.8–1.5 equivalent basic weight quantity per equivalent weight of $C_{14}$–$C_{22}$ fatty acid, (c) between about 0.0–0.4 equivalent weight of basic alkali metal compound per equivalent weight of $C_{14}$–$C_{22}$ fatty acid, (d) between about 10–80 weight percent of an aqueous medium, based on the weight of fatty acid, and (e) a biologically active ingredient comprising methionine hydroxy analog alkaline earth metal salt; and (2) recovering the salt product after completion of the exothermic salt-forming reaction.

The $C_{14}$–$C_{22}$ fatty acid component of the salt-forming reaction medium consists of one or more saturated or unsaturated carboxylic acids such as those derived from beef and mutton tallow, lard, cottonseed oil, palm oil, and the like.

Palm fatty acid distillate is a commercial product produced by distilling the fatty acids present in natural palm oil. A distillate product typically has the following weight percent content:

| | |
|---|---|
| Free fatty acids | 60–90 |
| Water | <1 |
| Triglycerides | 10–40 |
| Unsaponifiables | <3 |

The fatty acids in the free fatty acids and the triglycerides consist of the following weight percent: 0–10 lauric acid, 0–60 palmitic acid, 0–10 stearic acid, 0–60 oleic acid and 0–10 linoleic acid. More specifically the fatty acids in the free fatty acids and the triglycerides consist of the following weight percent

| $C_3$ | |
|---|---|
| Palmitic acid | 38–50 |
| oleic acid | 35–40 |
| Linoleic acid | 5–10 |
| Stearic acid | 3–6 |
| Lauric acid | 1–3 |

Beef tallow acids are available commercially as a byproduct obtained by alkaline extraction of waste beef fat and subsequent acidification, and normally contain the following weight percent of fatty constituents:

| | |
|---|---|
| Free fatty acids | 60–90 |
| Triglycerides | 10–40 |
| Water | <1 |
| Unsaponifiables | <3 |

The fatty acids in the free fatty acids and in the triglycerides have the following weight percent content:

| | |
|---|---|
| Palmitic acid | 22–28 |
| Oleic acid | 38–44 |
| Linoleic acid | 3–6 |
| Stearic acid | 18–24 |

Because $C_{14}$–$C_{22}$ fatty acids and glycerides are susceptible to atmospheric oxidation, it is advantageous to incorporate an oil-soluble antioxidant, and a chelating agent to bind any ferric, copper, zinc or other metal capable of catalyzing atmospheric oxidation. Suitable quantities for inclusion in the fatty acid bulk are about 0.03–0.1% or higher of antioxidant as permitted by regulation, and about 0.05–0.3% of chelating agent, based on the weight of fatty acid.

Illustrative of preferred additives are butylated hydroxytoluene antioxidant and citric acid chelating agent. The chelating agent is added in an edible solvent such as propylene glycol to facilitate blending into the fatty acid.

The calcium oxide component of the process can be utilized either alone or in combination with magnesium oxide. The calcium oxide component can be calcined limestone, which contains 93–96% CaO and not more than about 7% of $CaCO_3$. The basic oxide preferably has a particle size which passes a 100 mesh U.S. standard screen.

A basic alkali metal compound such as sodium carbonate can be included as an optional ingredient, to moderate the conversion of the free fatty acid ingredient to the corresponding calcium salt.

The biologically active ingredient quantity employed in the process typically will vary in the range between about 0.05–20 weight percent, based on the weight of $C_{14}$–$C_{22}$ fatty acid ingredient.

The biologically active ingredient comprises methionine hydroxy analog alkaline earth metal salt, such as the calcium salt or magnesium salt or a mixture thereof. The biologically active ingredient content additionally can contain an additive selected from nicotinamide, lysine, and salts thereof.

As illustrated in Example I, the selection of biologically active ingredient is restricted because many important nutrient compounds such as aminoacids do not survive the calcium oxide hydration and fatty acid salt-formation exothermic reaction conditions which are inherent in the invention process embodiments. Nutrient compounds such as nicotinic acid, methionine and choline are chemically transformed under the exothermic reaction conditions characteristic of the invention process.

As illustrated in Example II, if methionine hydroxy analog calcium salt is employed as a nutrient additive in a fatty acid calcium salt-forming reaction medium, then the salt-forming reaction proceeds smoothly to completion. The final product is in the form of free-flowing friable granules, and it consists essentially of a fatty acid calcium salt matrix having the methionine hydroxy analog calcium salt additive homogeneously distributed and incorporated therein. The encapsulated additive has rumen bypass protection.

Example II also demonstrates that the use of methionine hydroxy analog per se, or the sodium salt thereof, yields a fatty acid calcium salt product which is less pure, and is not in a free-flowing friable granule form.

In another embodiment this invention provides a ruminant feed supplement product comprising (1) at least one $C_{14}$–$C_{22}$ fatty acid calcium salt ingredient; and (2) between about 0.05–20 weight percent of a biologically active additive ingredient comprising methionine hydroxy analog alkaline earth metal salt, based on the weight of fatty acid calcium salt ingredient; wherein the biologically active additive is homogeneously distributed and incorporated in the fatty acid calcium salt ingredient, and has rumen bypass protection.

The ruminant feed supplement product can be produced by the present invention process, and can be obtained as a high purity composition in friable granule form.

The invention process can be conducted in a batch reactor or as a continuous operation. The fatty acid, calcium oxide, biologically active ingredient and aqueous medium can be admixed simultaneously, or the fatty acid and calcium oxide can be blended first and then combined with the other processing components.

In one processing method the fatty acid is heated to 60°–110° C. or higher, and then mixed with the basic oxide. After the aqueous medium and biologically active ingredient are added to the mixture, there is a short induction period which is followed by exothermic calcium oxide hydrating and fatty acid salt-forming reactions.

The amount of aqueous medium employed is sufficient to support the calcium oxide hydrating and fatty acid salt-forming reactions, and preferably is vaporized as steam during the exothermic reaction period to yield a friable fatty acid salt product which in granule form is suitable for use as an animal feed supplement.

A present invention fatty acid salt product is adapted to function as a rumen bypass dietary supplement in ruminant feed. An important advantage of a present invention dietary supplement composition is the rumen bypass protection which extends to all the biologically active ingredients of the composition, which normally are metabolized in the rumen.

The following Examples are further illustrative of the present invention. The components and specific ingredients are presented as being typical, and various modifications can be derived in view of the foregoing disclosure within the scope of the invention.

EXAMPLE I

This Example illustrates the chemical stability of a variety of biologically active ingredients under calcium oxide hydration and fatty acid salt-formation exothermic reaction conditions in accordance with the present invention process.

The fatty acid component is a palm fatty acid distillate of the following composition:

| | |
|---|---|
| Lauric acid | 2.3% |
| Palmitic acid | 49.9% |
| Stearic acid | 5.4% |
| Oleic acid | 35.0% |
| Linoleic acid | 7.4% |

Calcium oxide (100 g) and palm fatty acid distillate (700 g) are admixed, and then the mixture is blended with an aqueous medium (300 g) with stirring. Steam evolves during the exothermic calcium oxide hydration and fatty acid salt-forming reactions, and the final product is in the form of a friable solid.

The aqueous medium in separate runs contains 35 grams respectively of nicotinic acid, nicotinamide, choline, methionine, methionine hydroxy analog or methionine hydroxy analog calcium salt following the procedure of the control run.

Under the reaction conditions the quantity of nicotinic acid, methionine or choline ingredient in the initial stage of the process is diminished in the final product, while the original content of nicotinamide, methionine hydroxy analog or methionine hydroxy analog calcium salt is intact in the final product.

EXAMPLE II

This Example illustrates the effect of a nutrient additive on a fatty acid calcium salt-forming reaction.

A.

A calcium salt-forming reaction is conducted with the following ingredients:

| | |
|---|---|
| palm fatty acid distillate | 167.60g |
| calcium oxide | 24.72g |
| methionine hydroxy analog | 7.60g |
| water | 30.60g |

The palm fatty acid distillate oil is heated to 95° C. The methionine hydroxy analog is admixed with the heated oil, followed by the addition of calcium oxide and water with stirring.

Over a reaction period of 30 minutes, the palm fatty acid distillate remains substantially unreacted. The presence of methionine hydroxy analog has an inhibiting effect on the fatty acid calcium salt-forming reaction.

| B. | |
|---|---|
| palm fatty acid distillate | 167.60g |
| calcium oxide | 24.72g |
| methionine hydroxy analog | 7.60g |
| water | 30.60g |
| surfactant[1] | 1.00g |

[1]Myvatex Texture Lite; monoglycerides; Eastman Chemical Company

The palm fatty acid distillate oil is heated to 95° C. The surfactant is added to the heated oil with stirring, followed by the addition of methionine hydroxy analog with 1000 rpm stirring. The lime and water are added, and the reaction medium at 95° C. is stirred for a one hour period.

The palm fatty acid distillate remains substantially unreacted in the salt-forming reaction medium.

| C. | |
|---|---|
| palm fatty acid distillate | 167.60g |
| calcium oxide | 24.72g |
| methionine hydroxy analog | 7.60g |
| water | 30.60g |

The methionine hydroxy analog is blended with the water. The palm fatty acid distillate oil is heated to 95° C. and the lime and water are added to the oil with stirring. The reaction medium is heated to 107° C., and a partial conversion of fatty acid to fatty acid calcium salt occurs.

The final product consists of a tacky mass of agglomerated solids.

| D. | |
|---|---|
| palm fatty acid distillate | 167.60g |

| -continued | |
|---|---|
| D. | |
| calcium oxide | 24.72g |
| methionine hydroxy analog calcium salt | 9.00g |
| water | 30.60g |

The reaction medium is prepared following the procedure of section A above.

The salt-forming reaction proceeds over a period of about two hours. The final product is recovered and dried. The product consists essentially of palm fatty acid calcium salt with a content of homogeneously distributed and incorporated methionine hydroxy analog calcium salt. The product is in the form of friable granules.

If methionine hydroxy analog sodium salt is employed in place of the corresponding calcium salt, the salt-forming reaction period is prolonged, and the final product is in the form of tacky solids.

EXAMPLE III

This Example illustrates the continuous production of a dietary fatty acid calcium salt product in accordance with the present invention.

The process is operated continuously with equipment which is essentially the same as described and illustrated with reference to FIG. 1 of U.S. Pat. No. 4,826,694 by W. McAskie.

Calcium oxide from a hopper and hot palm oil distillate (96° C.) for a supply line are mixed in predetermined proportions in a mixing pump. An aqueous medium and crystalline methionine hydroxy analog calcium salt are added to the reactant blend by separate supply lines.

The aqueous medium is supplied to the reaction zone at a rate which provides about 30 weight percent of water; and 3 weight percent of methionine hydroxy analog calcium salt is supplied, based on the weight of palm fatty acid distillate.

The hydrated mixture formed in the process is passed through a mixing pump and the resultant semi-liquid reaction medium at about 100° C. is discharged as a spread layer onto a continuously moving conveyor belt. Steam evolves from the conveyor transported reaction mass.

At the end of the conveyor belt solid lumps of reaction product fall through a sizing machine onto a second conveyor belt. In this conveying zone the salt-forming reaction and evolution of water proceed to completion. The essentially dry fatty acid calcium salt product is passed through a sifter, and collected in bags suitable for transportation and storage.

The residence time on the first conveyor is about 30 minutes, and the overall production time from reactant mixing to collection of the dry granulated product is about 2.5 hours.

The final product has a total fatty acid calcium salt content of 85 weight percent, a methionine hydroxy analog calcium salt content of 2.6 weight percent, a water content of about 3–5 weight percent, and an ash content of about 15 weight percent.

The invention fatty acid calcium salt product can be incorporated as a dietary supplement in cattle feed such as hay silage or corn silage, in a calculated quantity which will provide each animal about 800–1000 grams per day of fatty acid salt, and about 25–30 grams per day of methionine hydroxy analog calcium salt.

The process is repeated, except that 1.5 weight percent each of nicotinamide and lysine hydrochloride as additional biologically active ingredients, based on the weight of fatty acid, are premixed with the methionine hydroxy analog calcium salt prior to admixture with the other process ingredients.

What is claimed is:

1. A process for the preparation of a ruminant feed supplement product which comprises (1) forming an admixture of ingredients comprising (a) at least one $C_{14}$–$C_{22}$ fatty acid, (b) calcium oxide in about a 0.8–1.5 equivalent basic weight quantity per equivalent weight of $C_{14}$–$C_{22}$ fatty acid, (c) between about 0.0–0.4 equivalent weight of basic alkali metal compound per equivalent weight of $C_{14}$–$C_{22}$ fatty acid, (d) between about 10–80 weight percent of an aqueous medium, based on the weight of fatty acid, and (e) a biologically active ingredient comprising methionine hydroxy analog calcium salt; (2) causing said admixture of ingredients to exothermically react to form a fatty-acid salt product and (3) recovering the salt product after completion of the exothermic salt-forming reaction.

2. A process in accordance with claim 1 wherein the fatty acid and calcium oxide compounds are premixed before admixture with the other process ingredients.

3. A process in accordance with claim 1 wherein the $C_{14}$–$C_{22}$ fatty acid ingredient is a mixture comprising 0–10 percent lauric acid, 0–60 percent palmitic acid, 0–10 percent stearic acid, 0–60 percent oleic acid, and 0–10 percent linoleic acid.

4. A process in accordance with claim 1 wherein the biologically active ingredient content is between about 0.05–20 weight percent, based on the weight of $C_{14}$–$C_{22}$ fatty acid.

5. A process in accordance with claim 1 wherein the biologically active ingredient content additionally contains an additive selected from nicotinamide, lysine, and salts thereof.

6. A process in accordance with claim 1 wherein the exothermic salt-forming reaction medium is at a temperature between about 60°–110° C.

7. A process in accordance with claim 1 wherein water evaporation occurs during the salt-forming reaction, and the salt product is recovered in the form of friable granules.

8. A ruminant feed supplement product comprising (1) at least one $C_{14}$–$C_{22}$ fatty acid calcium salt ingredient; and (2) between about 0.05–20 weight percent of a biologically active additive ingredient comprising methionine hydroxy analog calcium salt, based on the weight of fatty acid calcium salt ingredient; wherein the biologically active additive is homogeneously distributed and incorporated in the fatty acid calcium salt ingredient, and has rumen bypass protection.

9. A ruminant feed supplement product in accordance with claim 8 wherein the biologically active ingredient content additionally contains an additive selected from nicotinamide, lysine, and salts thereof.

10. A ruminant feed supplement product in accordance with claim 8 wherein the fatty acid calcium salt ingredient consists of palm fatty acid distillate calcium salt.

11. A ruminant feed supplement in accordance with claim 8 which is in friable granule form.

* * * * *